(12) United States Patent
Kanno et al.

(10) Patent No.: US 9,929,433 B2
(45) Date of Patent: *Mar. 27, 2018

(54) SULFIDE SOLID ELECTROLYTE MATERIAL, BATTERY, AND PRODUCING METHOD FOR SULFIDE SOLID ELECTROLYTE MATERIAL

(71) Applicants: TOKYO INSTITUTE OF TECHNOLOGY, Tokyo-to (JP); TOYOTA JIDOSHA KABUSHIKI KAISHA, Toyota-shi, Aichi-ken (JP)

(72) Inventors: Ryoji Kanno, Kawasaki (JP); Masaaki Hirayama, Yokohama (JP); Yuki Kato, Susono (JP); Hisatsugu Yamasaki, Gotenba (JP)

(73) Assignees: TOKYO INSTITUTE OF TECHNOLOGY, Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 55 days.

This patent is subject to a terminal disclaimer.

(21) Appl. No.: 14/760,344

(22) PCT Filed: Dec. 18, 2013

(86) PCT No.: PCT/JP2013/083949
§ 371 (c)(1),
(2) Date: Jul. 10, 2015

(87) PCT Pub. No.: WO2014/112277
PCT Pub. Date: Jul. 24, 2014

(65) Prior Publication Data
US 2015/0357673 A1 Dec. 10, 2015

(30) Foreign Application Priority Data

Jan. 17, 2013 (JP) ................................ 2013-006282

(51) Int. Cl.
*H01M 10/0562* (2010.01)
*H01M 10/052* (2010.01)
(Continued)

(52) U.S. Cl.
CPC .......... *H01M 10/0562* (2013.01); *H01B 1/10* (2013.01); *H01B 1/122* (2013.01);
(Continued)

(58) Field of Classification Search
CPC ..... H01M 2300/0068; H01M 10/0562; H01M 10/052; H01M 4/62; H01M 2220/30;
(Continued)

(56) References Cited

U.S. PATENT DOCUMENTS

| 8,697,292 B2 * | 4/2014 | Kanno | .................... C01B 17/20 429/304 |
| 2007/0160911 A1 | 7/2007 | Senga et al. | |
| 2013/0040208 A1 * | 2/2013 | Kanno | .................... C01B 17/20 429/319 |

FOREIGN PATENT DOCUMENTS

| CN | 1918668 A | 2/2007 |
| CN | 102823049 A | 12/2012 |

(Continued)

OTHER PUBLICATIONS

Wordhippo {http://www.wordhippo.com/what- is/another- word-for/according_to.html} with Wayback Machine Evidence: Feb. 6, 2012.*

(Continued)

*Primary Examiner* — Sarah A. Slifka
*Assistant Examiner* — Aaron J Greso
(74) *Attorney, Agent, or Firm* — Oliff PLC

(57) ABSTRACT

The problem is to provide a sulfide solid electrolyte material with favorable Li ion conductivity in a low-temperature environment. The problem is overcome by providing a
(Continued)

sulfide solid electrolyte material comprising an $M_1$ element (such as an Li element and an Mg element), an $M_2$ element (such as a Ge element and a P element) and a S element, wherein the sulfide solid electrolyte material has a peak at a position of $2\theta=29.58°\pm0.50°$ in X-ray diffraction measurement using a CuKα ray, does not have a peak at a position of $2\theta=27.33°\pm0.50°$ or slightly having the peak, and a substituted amount δ(%) of the divalent element in the $M_1$ element is in such a range that the sulfide solid electrolyte material exhibits higher Li ion conductance at 0° C. than the case of δ=0.

7 Claims, 4 Drawing Sheets

(51) Int. Cl.
  *H01B 1/12* (2006.01)
  *H01M 4/62* (2006.01)
  *H01B 1/10* (2006.01)
(52) U.S. Cl.
  CPC ........... *H01M 4/62* (2013.01); *H01M 10/052* (2013.01); *H01M 2220/30* (2013.01); *H01M 2300/0068* (2013.01); *Y02T 10/7011* (2013.01)
(58) Field of Classification Search
  CPC ....... Y02T 10/7011; H01B 1/10; H01B 1/122; H01B 1/12
  See application file for complete search history.

(56) References Cited

FOREIGN PATENT DOCUMENTS

| JP | 2003-022841 A | 1/2003 | | |
|---|---|---|---|---|
| JP | 2005-228570 A | 8/2005 | | |
| JP | 2008103229 A | 5/2008 | | |
| JP | 2008-130229 A | 6/2008 | | |
| JP | 2009-093995 A | 4/2009 | | |
| JP | 2010-030889 A | 2/2010 | | |
| JP | 2010-036823 A | 2/2010 | | |
| JP | 2010-040457 A | 2/2010 | | |
| JP | 2013-033659 A | 2/2013 | | |
| WO | 2011/118801 A1 | 9/2011 | | |
| WO | WO 2011/118801 | * | 9/2011 | ........ H01M 10/0562 |
| WO | WO 2011118801 | * | 9/2011 | ........ H01M 10/0562 |

OTHER PUBLICATIONS

Kanno, Ryoji, "Lithium Ionic Conductor Thio-LISICON the Li2S-GeS2-P2S5 System," Journal of Electrochemical Society, vol. 148, No. 7, (2001), pp. A742-A746.
Kamaya, Noriaki, "A Lithium Superionic Conductor," Nature Materials, Advanced online publication, Jul. 31, 2011, DOI:10.1038/NMAT3066.
Takada, Kazunori, "Lithium Ion Conduction in Lithium Magnesium Thio-Phosphate," Solid State Ionics, vol. 147, (2002), pp. 23-27.
Jun. 28, 2011 International Search Report issued in International Patent Application No. PCT/JP2011/057421.
U.S. Appl. No. 13/636,954, filed Oct. 23, 2012 in the name of Ryoji Kanno et al.
Sep. 8, 2017 Office Action issued in U.S. Appl. No. 14/375,571.
Murayama, M., et al., "Structure of the thio-LISICON, Li4GeS4," Solid State Ionics, vol. 154-155, 2002, pp. 789-794.
Kanno, Ryoji, "Electrolytes: Solid Sulfide," Secondary Batteries—Lithium Rechargeable Systems, 2009, pp. 129-137.
Kamaya, N., et al., "A Lithium Superionic Conductor," Nature Materials, vol. 10, 2011, pp. 682-686.
Matsumura, T., "Nickel sulfides as a cathode for all-solid-state ceramic llithium batteries," The Journal of Power Sources, vol. 174, 2007, pp. 632-636.
Hayashi, A., et al., "Formation of superionic crystals from mechanically milled Li2S-P2S5 glasses," Electrochemistry Communications, vol. 5, 2003, pp. 111-114.
Inada, T., et al., "All solid-state sheet battery using lithium inorganic solid electrolyte, thio-LISICON," Journal of Power Sources, vol. 194, 2009, pp. 1085-1088.
Murayama, M., et al., "Material design of new lithium conductor, thio-LISICON, in the Li2S-P2S5 system," Solid State Ionics, vol. 170, 2004, pp. 173-180.
Takada, K., "Lithium ion conductive oxysulfide, Li3PO4-Li3PS4," Solid State Ionics, vol. 176, 2005, 2355-2359.
Kanno, R., et al., "Synthesis of a new lithium ionic conductor, thio-LISICON-lithium germanium sulfide system," Solid State Ionics, vol. 130, 2000, pp. 97-104.
Murayama, M., "Synthesis of New Lithium Ionic Conductor Thio-LISICON-Lithium Silicon Sulfides System," Journal of Solid State Chemistry, vol. 168, 2002, pp. 140-148.
Kanno, R., Murayama, M. and Sakamo, K., "New Lithium Solid Electroylytes, Thio-LISICON: Materials Design Concept and Application to Solid State Battery," Solid State Ionics: Trends in the New Millenium, 2002, pp. 13-22.
Leal-Gonzalez, J., Melibary, S., and Smith, A.J., "Structure of Lithium Galllium Sulfide, LiGaS2," Acta Cryst., vol. C46, 2017-2019.
Tae Ahn, Byung and Huggins, Robert, "Synthesis and Lithium Conductivities of Li2SiS3 and Li4SiS4," Mat. Res. Bull., vol. 24, 1989, pp. 889-897.
Tachez, M., "Ionic Conductivity of and Phase Transition in Lithium Thiophosphate Li3PS4," Solid State Ionics, vol. 14, pp. 181-185.
Mercier, R., et al., "Synthese, structure cristalline et anaylse vibrationnnelle de L'hexathiohypodiphosphate de lithium Li4P2S6," Journal of Solid State Chemistry, vol. 43, 1982, pp. 151-162 (with English abstract).
Brie, J.F., et al, "Chimie Minerale—preparation et etude de deux sulfures temaire de lithium et de phosphore: Li8P2S9 et Li7PS6, " C.R. Acad. Sc. Paris, vol. 283, 1996, pp. 581-584 (with English abastract).
Jan. 30, 2017 Restriction Requirement issued in U.S. Appl. No. 14/375,571.
Aug. 7, 2013 Office Action issued in U.S. Appl. No. 13/636,954.

* cited by examiner

UPPER ROW: SULFIDE SOLID ELECTROLYTE MATERIAL WITH HIGH ION CONDUCTIVITY
LOWER ROW: SULFIDE SOLID ELECTROLYTE MATERIAL WITH LOW ION CONDUCTIVITY 27.33° ±0.50°
29.58° ±0.50°
29.78° ±0.50°

OCTAHEDRON O
(SUCH AS $LiS_6$ AND $MgS_6$)

TETRAHEDRON $T_1$
(SUCH AS $GeS_4$ AND $PS_4$)

TETRAHEDRON $T_2$
(SUCH AS $PS_4$)

SULFIDE SOLID ELECTROLYTE MATERIAL, BATTERY, AND PRODUCING METHOD FOR SULFIDE SOLID ELECTROLYTE MATERIAL

TECHNICAL FIELD

The present invention relates to a sulfide solid electrolyte material with favorable Li ion conductivity in a low-temperature environment.

BACKGROUND ART

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery has been presently noticed from the viewpoint of a high energy density among various kinds of batteries.

Liquid electrolyte containing a flammable organic solvent is used for a presently commercialized lithium battery, so that the installation of a safety device for restraining temperature rise during a short circuit and the improvement in structure and material for preventing the short circuit are necessary therefor. On the contrary, a lithium battery all-solidified by replacing the liquid electrolyte with a solid electrolyte layer is conceived to intend the simplification of the safety device and be excellent in production cost and productivity for the reason that the flammable organic solvent is not used in the battery.

A sulfide solid electrolyte material is known as a solid electrolyte material used for an all solid lithium battery. For example, in Non Patent Literature 1, an Li ion conductor (a sulfide solid electrolyte material) having a composition of $Li_{(4-x)}Ge_{(1-x)}P_xS_4$ is disclosed. Also, in Patent Literature 1, an LiGePS-based sulfide solid electrolyte material with a high ratio of a crystal phase having a specific peak in X-ray diffraction measurement is disclosed. In addition, in Non Patent Literature 2, an LiGePS-based sulfide solid electrolyte material is disclosed.

CITATION LIST

Patent Literature

Patent Literature 1: WO 2011/118801 A

Non Patent Literature

Non Patent Literature 1: Ryoji Kanno et al., "Lithium Ionic Conductor Thio-LISICON The Li2S—GeS2-P2S5 System", Journal of The Electrochemical Society, 148 (7) A742-A746 (2001)

Non Patent Literature 2: Noriaki Kamaya et al., "A lithium superionic conductor", Nature Materials, Advanced online publication, 31 Jul. 2011, DOI:10.1038/NMAT3066

SUMMARY OF INVENTION

Technical Problem

A solid electrolyte material with favorable ion conductivity is demanded from the viewpoint of achieving higher output of a battery. In Patent Literature 1, it is disclosed that a sulfide solid electrolyte material with a high ratio of a crystal phase having a specific peak in X-ray diffraction measurement has favorable ion conductivity. On the other hand, the problem is that with regard to an LiGePS-based sulfide solid electrolyte material described in Patent Literature 1, Li ion conductivity deteriorates in a low-temperature environment similarly to a general electrolyte material.

The present invention has been made in view of the problem, and the main object thereof is to provide a sulfide solid electrolyte material with favorable Li ion conductivity in a low-temperature environment.

Solution to Problem

In order to solve the problems, the present invention provides a sulfide solid electrolyte material comprising an $M_1$ element, an $M_2$ element and a S element, the $M_1$ being a combination of Li and a divalent element of at least one kind selected from the group consisting of Mg, Ca and Zn, and the $M_2$ being at least one kind selected from the group consisting of P, Sb, Si, Ge, Sn, B, Al, Ga, In, Ti, Zr, V and Nb, characterized in that the sulfide solid electrolyte material has a peak at a position of $2\theta=29.58°\pm0.50°$ in X-ray diffraction measurement using a CuKα ray, does not have a peak at a position of $2\theta=27.33°\pm0.50°$ in X-ray diffraction measurement using a CuKα ray, or when diffraction intensity at the peak of $2\theta=29.58°\pm0.50°$ is regarded as $I_A$ and diffraction intensity at the peak of $2\theta=27.33°\pm0.50°$ is regarded as $I_B$ in the case of having a peak at the position of $2\theta=27.33°\pm0.50°$, a value of $I_B/I_A$ is less than 0.50, and a substituted amount $\delta(\%)$ of the divalent element is in such a range that the sulfide solid electrolyte material exhibits higher Li ion conductance at 0° C. than the case of $\delta=0$;

$$\text{substituted amount } \delta(\%)=2X_{1B}/(X_{1A}+2X_{1B})*100$$

($X_{1A}$ is a molar fraction of the Li in the $M_1$ and $X_{1B}$ is a molar fraction of the divalent element in the $M_1$).

According to the present invention, the ratio of a crystal phase having a peak in the vicinity of $2\theta=29.58°$ is so high as to allow the sulfide solid electrolyte material with favorable ion conductivity. In addition, the substitution of part of Li with the divalent element allows the sulfide solid electrolyte material with favorable Li ion conductivity in a low-temperature environment.

Also, the present invention provides a sulfide solid electrolyte material having an octahedron O composed of an $M_1$ element and a S element, a tetrahedron $T_1$ composed of an $M_{2a}$ element and a S element, and a tetrahedron $T_2$ composed of an $M_{2b}$ element and a S element, in which the tetrahedron $T_1$ and the octahedron O share an edge, and the tetrahedron $T_2$ and the octahedron O contain a crystal structure sharing a corner as the main body, characterized in that the $M_1$ is a combination of Li and a divalent element of at least one kind selected from the group consisting of Mg, Ca and Zn, the $M_{2a}$ and the $M_{2b}$ are each independently at least one kind selected from the group consisting of P, Sb, Si, Ge, Sn, B, Al, Ga, In, Ti, Zr, V and Nb, and a substituted amount $\delta(\%)$ of the divalent element is in such a range that the sulfide solid electrolyte material exhibits higher Li ion conductance at 0° C. than the case of $\delta=0$;

$$\text{substituted amount } \delta(\%)=2X_{1B}/(X_{1A}+2X_{1B})*100$$

($X_{1A}$ is a molar fraction of the Li in the $M_1$ and $X_{1B}$ is a molar fraction of the divalent element in the $M_1$).

According to the present invention, the octahedron O, the tetrahedron $T_1$ and the tetrahedron $T_2$ have a predetermined crystal structure (a three-dimensional structure), so as to allow the sulfide solid electrolyte material with favorable ion conductivity. In addition, the substitution of part of Li with the divalent element allows the sulfide solid electrolyte material with favorable Li ion conductivity in a low-temperature environment.

In the invention, the substituted amount δ(%) preferably satisfies 0<δ<1.

Also, the present invention provides a battery comprising a cathode active material layer containing a cathode active material, an anode active material layer containing an anode active material, and an electrolyte layer formed between the cathode active material layer and the anode active material layer, characterized in that at least one of the cathode active material layer, the anode active material layer and the electrolyte layer contains the sulfide solid electrolyte material described above.

According to the present invention, the use of the sulfide solid electrolyte material described above allows the high-output battery resistant to a low-temperature environment.

Also, the present invention provides a producing method for a sulfide solid electrolyte material having the peak intensity ratio described above, the producing method comprising: an ion conductive material synthesizing step of synthesizing an amorphized ion conductive material by mechanical milling while using a raw material composition containing the $M_1$ element, the $M_2$ element and the S element, and a heating step of obtaining the sulfide solid electrolyte material by heating the amorphized ion conductive material.

According to the present invention, amorphization is performed in the ion conductive material synthesizing step to thereafter perform the heating step, so as to allow the sulfide solid electrolyte material such that the ratio of a crystal phase having a peak in the vicinity of 2θ=29.58° is high.

Also, the present invention provides a producing method for a sulfide solid electrolyte material having the crystal structure described above, the producing method comprising: an ion conductive material synthesizing step of synthesizing an amorphized ion conductive material by mechanical milling while using a raw material composition containing the $M_1$ element, the $M_{2a}$ element, the $M_{2b}$ element and the S element, and a heating step of obtaining the sulfide solid electrolyte material by heating the amorphized ion conductive material.

According to the present invention, amorphization is performed in the ion conductive material synthesizing step to thereafter perform the heating step, so as to allow the sulfide solid electrolyte material such that the octahedron O, the tetrahedron $T_1$ and the tetrahedron $T_2$ have a predetermined crystal structure (a three-dimensional structure).

Advantageous Effects of Invention

The present invention attains the effect such as to allow a sulfide solid electrolyte material with favorable Li ion conductivity in a low-temperature environment.

DESCRIPTION OF EMBODIMENTS

Figure 1:
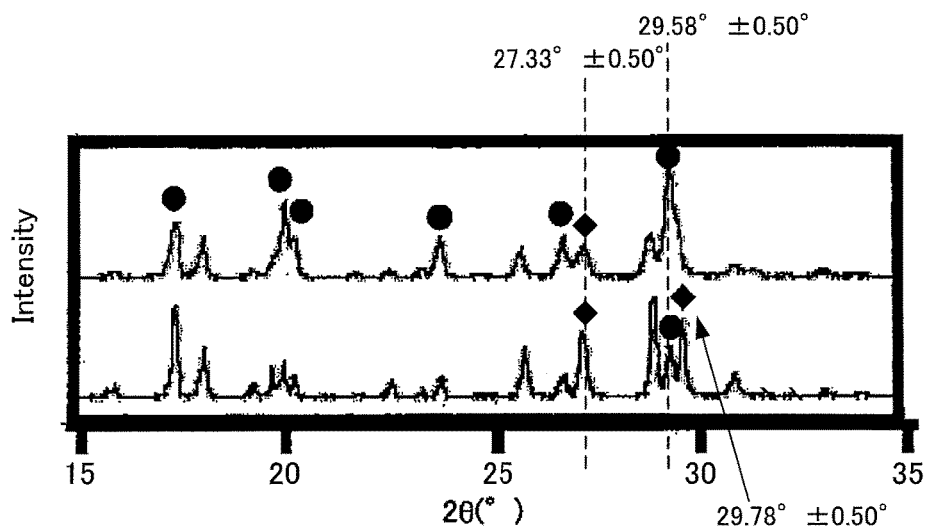
FIG. 1 is an X-ray diffraction spectrum explaining a difference between a sulfide solid electrolyte material with high ion conductivity and a sulfide solid electrolyte material with low ion conductivity.

A sulfide solid electrolyte material, a battery and a producing method for a sulfide solid electrolyte material of the present invention are hereinafter described in detail.

A. Sulfide Solid Electrolyte Material

First, a sulfide solid electrolyte material of the present invention is described. The sulfide solid electrolyte material of the present invention may be roughly divided into two embodiments. Then, the sulfide solid electrolyte material of the present invention is described while divided into a first embodiment and a second embodiment.

1. First Embodiment

A sulfide solid electrolyte material of a first embodiment comprises an $M_1$ element, an $M_2$ element and a S element, in which the $M_1$ is a combination of Li and a divalent element of at least one kind selected from the group consisting of Mg, Ca and Zn, and the $M_2$ is at least one kind selected from the group consisting of P, Sb, Si, Ge, Sn, B, Al, Ga, In, Ti, Zr, V and Nb, characterized in that the sulfide solid electrolyte material has a peak at a position of 2θ=29.58°±0.50° in X-ray diffraction measurement using a CuKα ray, does not have a peak at a position of 2θ=27.33°±0.50° in X-ray diffraction measurement using a CuKα ray, or when diffraction intensity at the peak of 2θ=29.58°±0.50° is regarded as $I_A$ and diffraction intensity at the peak of 2θ=27.33°±0.50° is regarded as $I_B$ in the case of having a peak at the position of 2θ=27.33°±0.50°, a value of $I_B/I_A$ is less than 0.50, and a substituted amount δ(%) of the divalent element is in such a range that the sulfide solid electrolyte material exhibits higher Li ion conductance at 0° C. than the case of δ=0;

substituted amount δ(%)=$2X_{1B}/(X_{1A}+2X_{1B})*100$ ($X_{1A}$ is a molar fraction of the Li in the $M_1$ and $X_{1B}$ is a molar fraction of the divalent element in the $M_1$).

According to the first embodiment, the ratio of a crystal phase having a peak in the vicinity of 2θ=29.58° is so high as to allow the sulfide solid electrolyte material with favorable ion conductivity. In addition, the substitution of part of Li with the divalent element allows the sulfide solid electrolyte material with favorable Li ion conductivity in a low-temperature environment. Li ion conductivity of the electrolyte material has temperature dependency and ordinarily deteriorates in a low-temperature environment. As a result, battery resistance increases and output decreases. On the contrary, in the first embodiment, the substitution of part of Li with the divalent element allows the sulfide solid electrolyte material with favorable Li ion conductivity in a low-temperature environment. The reason is guessed to be as follows. That is to say, the substitution of part of Li with the divalent element (such as Mg) allows two Li atoms to be substituted with one Mg atom so as to maintain electrical neutrality. Thus, it is guessed that the Li amount may decrease to reduce activation energy of Li ion conduction. In the case where part of Li is not substituted with the divalent element, in a low-temperature environment, the Li amount is so large as to bring a state such that the site is filled (a state of high activation energy); meanwhile, in the first embodiment, it is guessed that the substitution of part of Li with the divalent element allows a state of low activation energy to be maintained even in a low-temperature environment.

FIG. 1 is an X-ray diffraction spectrum explaining a difference between a sulfide solid electrolyte material with high ion conductivity and a sulfide solid electrolyte material with low ion conductivity. Incidentally, both of the two sulfide solid electrolyte materials in FIG. 1 have a composition of $Li_{3.25}Ge_{0.25}P_{0.75}S_4$. In FIG. 1, the sulfide solid electrolyte material with high ion conductivity has a peak at a position of $2\theta=29.58°\pm0.50°$ and a position of $2\theta=27.33°\pm0.50°$. Also, in FIG. 1, the sulfide solid electrolyte material with low ion conductivity has the same peak. Here, it is conceived that a crystal phase having a peak in the vicinity of $2\theta=29.58°$ and a crystal phase having a peak in the vicinity of $2\theta=27.33°$ are crystal phases different from each other. Incidentally, in the first embodiment, the crystal phase having a peak in the vicinity of $2\theta=29.58°$ and the crystal phase having a peak in the vicinity of $2\theta=27.33°$ are occasionally referred to as 'crystal phase A' and 'crystal phase B', respectively. The crystal structure of this crystal phase A is conceived to be the crystal structure described in the after-mentioned second embodiment.

Both of the crystal phases A and B are crystal phases exhibiting ion conductivity, which is different. The crystal phase A is conceived to be remarkably high in ion conductivity as compared with the crystal phase B. A conventional synthesis method (such as a solid-phase method) has not been capable of decreasing the ratio of the crystal phase B with low ion conductivity, and has not been capable of sufficiently heightening ion conductivity. On the contrary, in the first embodiment, the crystal phase A with high ion conductivity may be precipitated so positively as to allow the sulfide solid electrolyte material with high ion conductivity.

Also, in the first embodiment, in order to distinguish from the sulfide solid electrolyte material with low ion conductivity, diffraction intensity at a peak in the vicinity of $2\theta=29.58°$ is regarded as $I_A$ and diffraction intensity at a peak in the vicinity of $2\theta=27.33°$ is regarded as $I_B$, and a value of $I_B/I_A$ is prescribed at less than 0.50. Incidentally, it is conceived that a conventional synthesis method has not allowed the sulfide solid electrolyte material such that a value of $I_B/I_A$ is less than 0.50. Also, from the viewpoint of ion conductivity, the sulfide solid electrolyte material of the first embodiment is preferably high in the ratio of the crystal phase A with high ion conductivity. Thus, a value of $I_B/I_A$ is preferably smaller; specifically, preferably 0.45 or less, more preferably 0.25 or less, far more preferably 0.15 or less, particularly preferably 0.07 or less. Also, a value of $I_B/I_A$ is preferably 0. In other words, it is preferable that the sulfide solid electrolyte material of the first embodiment does not have a peak in the vicinity of $2\theta=27.33°$ as a peak of the crystal phase B.

The sulfide solid electrolyte material of the first embodiment has a peak in the vicinity of $2\theta=29.58°$. This peak is one of the peaks of the crystal phase A with high ion conductivity, as described above. Here, $2\theta=29.58°$ is an actual measurement value, and a crystal lattice changes somewhat due to factors such as material composition, so that a position of the peak occasionally shifts somewhat from $2\theta=29.58°$. Thus, in the first embodiment, the peak of the crystal phase A is defined as a peak at a position of $2\theta=29.58°\pm0.50°$. The crystal phase A is ordinarily conceived to have peaks of $2\theta=17.38°, 20.18°, 20.44°, 23.56°, 23.96°, 24.93°, 26.96°, 29.07°, 29.58°, 31.71°, 32.66°$ and $33.39°$. Incidentally, also these peak positions occasionally shift in a range of $\pm0.50°$.

On the other hand, the peak in the vicinity of $2\theta=27.33°$ is one of the peaks of the crystal phase B with low ion conductivity, as described above. Here, $2\theta=27.33°$ is an actual measurement value, and a crystal lattice changes somewhat due to factors such as material composition, so that a position of the peak occasionally shifts somewhat from $2\theta=27.33°$. Thus, in the first embodiment, the peak of the crystal phase B is defined as a peak at a position of $2\theta=27.33°\pm0.50°$. The crystal phase B is ordinarily conceived to have peaks of $2\theta=17.46°, 18.12°, 19.99°, 22.73°, 25.72°, 27.33°, 29.16°$ and $29.78°$. Incidentally, also these peak positions occasionally shift in a range of $\pm0.50°$.

Also, the sulfide solid electrolyte material of the first embodiment comprises an $M_1$ element, an $M_2$ element and a S element. The $M_1$ is ordinarily a combination of Li and a divalent element of at least one kind selected from the group consisting of Mg, Ca and Zn. In addition, in the first embodiment, a substituted amount $\delta(\%)$ of the divalent element is defined by the following formula.

Substituted amount $\delta(\%)=2X_{1B}/(X_{1A}+2X_{1B})*100$ ($X_{1A}$ is a molar fraction of the Li in the $M_1$ and $X_{1B}$ is a molar fraction of the divalent element in the $M_1$).

The substituted amount $\delta(\%)$ is ordinarily in such a range that the sulfide solid electrolyte material exhibits higher Li ion conductance at 0° C. than the case of $\delta=0$. Here, the range such that the sulfide solid electrolyte material exhibits higher Li ion conductance than the case of $\delta=0$ may be obtained by the following preparatory experiment. That is to say, the sulfide solid electrolyte material ($\delta>0$) of the first embodiment and a sulfide solid electrolyte material ($\delta=0$) for comparative object are prepared to perform an experiment for measuring Li ion conductance at 0° C. on the same conditions (such as the conditions described in the after-mentioned example), and a range such that Li ion conductance does not become less than the case of the sulfide solid electrolyte material ($\delta=0$) for comparative object may be determined as 'the range such that the sulfide solid electrolyte material exhibits higher Li ion conductance than the case of $\delta=0$'. Incidentally, for example, in the case where the composition of the sulfide solid electrolyte material of the first embodiment is $Li_{3.43275}Mg_{0.008625}Ge_{0.45}P_{0.55}S_4$ ($\delta=0.5\%$), the composition of the corresponding sulfide solid electrolyte material for comparative object is $Li_{3.45}Ge_{0.45}P_{0.55}S_4$ ($\delta=0$). Incidentally, the substituted amount $\delta$ may be obtained by ICP (high-frequency inductively coupled plasma) emission spectral analysis.

On the other hand, the $M_2$ is preferably a trivalent, tetravalent or pentavalent element, and contains at least a tetravalent element more preferably. Also, the $M_2$ is ordinarily at least one kind selected from the group consisting of P, Sb, Si, Ge, Sn, B, Al, Ga, In, Ti, Zr, V and Nb. Above all, in the first embodiment, the $M_2$ is preferably at least one kind selected from the group consisting of P, Ge, Al, Zr, Sn and B, and is more preferably at least one of P and Ge. Also, the $M_2$ may be elements of two kinds or more.

Also, in the after-mentioned examples, LiMgGePS-based sulfide solid electrolyte materials are really synthesized and X-ray diffraction measurement of an obtained sample is performed to confirm that $I_B/I_A$ is a predetermined value or less. On the other hand, the sulfide solid electrolyte material of the first embodiment ordinarily has a predetermined crystal structure described in the after-mentioned second embodiment. It is guessed that an optional combination of $M_1$ element and $M_2$ element may offer the same crystal structure as the sulfide solid electrolyte material mentioned above. Thus, it is conceived that any optional combination of $M_1$ element and $M_2$ element allows the sulfide solid electrolyte material with favorable ion conductivity. Also, a position of a peak in X-ray diffraction depends on a crystal structure, so that it is conceived that a similar XRD pattern is obtained irrespective of kinds of $M_1$ element and $M_2$ element if the sulfide solid electrolyte material has the above-mentioned crystal structure.

Also, the sulfide solid electrolyte material of the first embodiment preferably comprises an Li element, the divalent element $M^{(II)}$ described above, a Ge element, a P element and a S element. In addition, the composition of the $LiM^{(II)}GePS$-based sulfide solid electrolyte material is not particularly limited if the composition is a composition such as to allow a predetermined value of $I_B/I_A$, but is preferably a composition in which part of Li in $Li_{(4-x)}Ge_{(1-x)}P_xS_4$ (x satisfies 0<x<1) is substituted with $M^{(II)}$, for example. The reason therefor is to allow the sulfide solid electrolyte material with high ion conductivity. Here, a composition of $Li_{(4-x)}Ge_{(1-x)}P_xS_4$ corresponds to a composition of a solid solution of $Li_3PS_4$ and $Li_4GeS_4$. That is to say, this composition corresponds to a composition on a tie line of $Li_3PS_4$ and $Li_4GeS_4$. Both $Li_3PS_4$ and $Li_4GeS_4$ correspond to an ortho-composition and have the advantages that chemical stability is high and stability against moisture is high.

Also, "x" in the $Li_{(4-x)}Ge_{(1-x)}P_xS_4$ is not particularly limited if the "x" is a value such as to allow a predetermined value of $I_B/I_A$, but satisfies preferably 0.4≤x, more preferably 0.5≤x, for example. On the other hand, the "x" satisfies preferably x≤0.8, more preferably x≤0.75. The reason therefor is that such a range of "x" allows a value of $I_B/I_A$ to be further decreased. Thus, the sulfide solid electrolyte material with further favorable ion conductivity may be obtained.

The sulfide solid electrolyte material of the first embodiment is ordinarily a crystalline sulfide solid electrolyte material. Also, the sulfide solid electrolyte material of the first embodiment is preferably high in ion conductivity, and ion conductivity of the sulfide solid electrolyte material at 25° C. is preferably $1.0 \times 10^{-3}$ S/cm or more. Also, the shape of the sulfide solid electrolyte material of the first embodiment is not particularly limited but examples thereof include a powdery shape. In addition, the average particle diameter of the powdery sulfide solid electrolyte material is preferably within a range of 0.1 μm to 50 μm, for example.

The sulfide solid electrolyte material of the first embodiment has so high ion conductivity as to be capable of being used for optional uses in which ion conductivity is required. Above all, the sulfide solid electrolyte material of the first embodiment is preferably used for a battery. The reason therefor is to be capable of greatly contributing to achieving higher output of a battery. Also, a producing method for the sulfide solid electrolyte material of the first embodiment is described in detail in the after-mentioned 'C. Producing method for sulfide solid electrolyte material'. Also, the sulfide solid electrolyte material of the first embodiment may have characteristics of the after-mentioned second embodiment together.

2. Second Embodiment

Next, a second embodiment of a sulfide solid electrolyte material of the present invention is described. The sulfide solid electrolyte material of the second embodiment has an octahedron O composed of an $M_1$ element and a S element, a tetrahedron $T_1$ composed of an $M_{2a}$ element and a S element, and a tetrahedron $T_2$ composed of an $M_{2b}$ element and a S element, the tetrahedron $T_1$ and the octahedron O share an edge, and the tetrahedron $T_2$ and the octahedron O contain a crystal structure sharing a corner as the main body, characterized in that the $M_1$ is a combination of Li and a divalent element of at least one kind selected from the group consisting of Mg, Ca and Zn, the $M_{2a}$ and the $M_{2b}$ are each independently at least one kind selected from the group consisting of P, Sb, Si, Ge, Sn, B, Al, Ga, In, Ti, Zr, V and Nb, and a substituted amount δ(%) of the divalent element is in such a range that the sulfide solid electrolyte material exhibits higher Li ion conductance at 0° C. than the case of δ=0.

$$\text{Substituted amount } \delta(\%) = 2X_{1B}/(X_{1A} + 2X_{1B}) \times 100$$

($X_{1A}$ is a molar fraction of the Li in the $M_1$ and $X_{1B}$ is a molar fraction of the divalent element in the $M_1$)

According to the second embodiment, the octahedron O, the tetrahedron $T_1$ and the tetrahedron $T_2$ have a predetermined crystal structure (a three-dimensional structure), so as to allow the sulfide solid electrolyte material with favorable ion conductivity. In addition, the substitution of part of Li with the divalent element allows the sulfide solid electrolyte material with favorable Li ion conductivity in a low-temperature environment.

Figure 2:
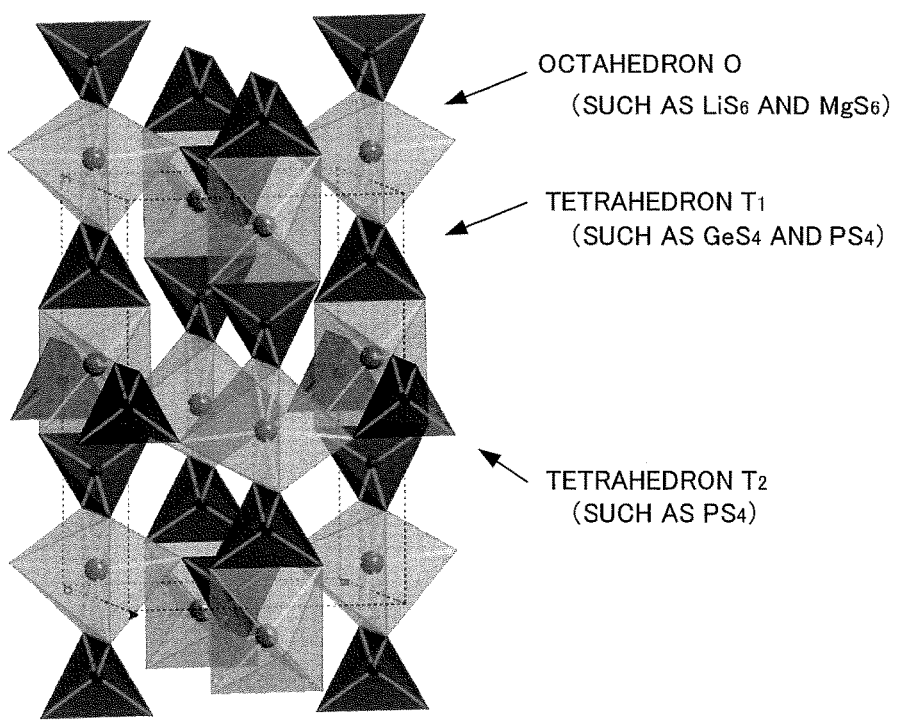
FIG. 2 is a perspective view explaining an example of a crystal structure of a sulfide solid electrolyte material of the present invention.

FIG. 2 is a perspective view explaining an example of a crystal structure of the sulfide solid electrolyte material of the second embodiment. In the crystal structure shown in FIG. 2, the octahedron O has $M_1$ as the central element, and has six pieces of S at the corner of the octahedron; typically, $LiS_6$ octahedron and $MgS_6$ octahedron. The tetrahedron $T_1$ has $M_{2a}$ as the central element, and has four pieces of S at the corner of the tetrahedron; typically, $GeS_4$ tetrahedron and $PS_4$ tetrahedron. The tetrahedron $T_2$ has $M_{2b}$ as the central element, and has four pieces of S at the corner of the tetrahedron; typically, $PS_4$ tetrahedron. In addition, the tetrahedron $T_1$ and the octahedron O share an edge, and the tetrahedron $T_2$ and the octahedron O share a corner.

The sulfide solid electrolyte material of the second embodiment is greatly characterized by containing the above-described crystal structure as the main body. The ratio of the above-described crystal structure in the whole crystal structure of the sulfide solid electrolyte material is not particularly limited but is preferably higher. The reason therefor is to allow the sulfide solid electrolyte material with high ion conductivity. The ratio of the above-described crystal structure is, specifically, preferably 70% by weight or more, more preferably 90% by weight or more. Incidentally, the ratio of the above-described crystal structure may be measured by synchrotron radiation XRD, for example. In particular, the sulfide solid electrolyte material of the second embodiment is preferably a single-phase material of the above-described crystal structure. The reason therefor is to allow ion conductivity to be extremely heightened.

Incidentally, the $M_1$ element, the $M_2$ element ($M_{2a}$ element and $M_{2b}$ element), and other items in the second embodiment are the same as the first embodiment described above; therefore, the description herein is omitted.

B. Battery

Next, a battery of the present invention is described. The battery of the present invention is a battery comprising a cathode active material layer containing a cathode active material, an anode active material layer containing an anode active material, and an electrolyte layer formed between the cathode active material layer and the anode active material layer, characterized in that at least one of the cathode active material layer, the anode active material layer and the electrolyte layer contains the sulfide solid electrolyte material described above.

According to the present invention, the use of the sulfide solid electrolyte material described above allows the high-output battery resistant to a low-temperature environment.

Figure 3:
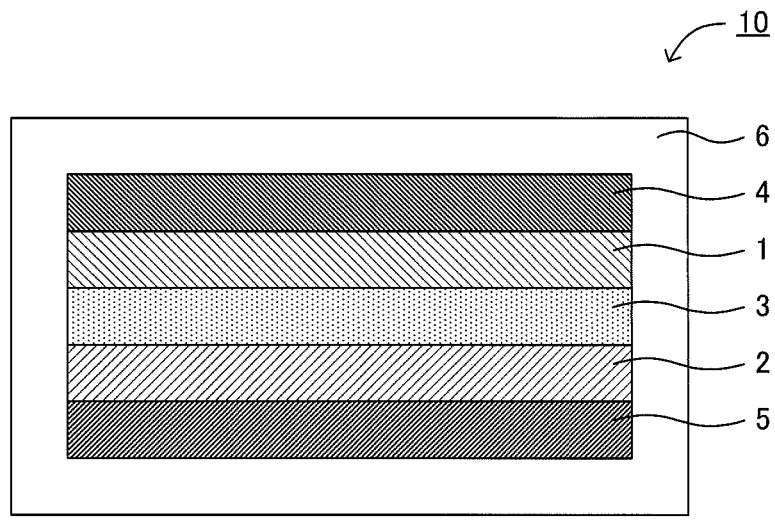
FIG. 3 is a schematic cross-sectional view showing an example of a battery of the present invention.

FIG. 3 is a schematic cross-sectional view showing an example of the battery of the present invention. A battery 10 in FIG. 3 comprises a cathode active material layer 1 containing a cathode active material, an anode active material layer 2 containing an anode active material, an electrolyte layer 3 formed between the cathode active material layer 1 and the anode active material layer 2, a cathode current collector 4 for collecting the cathode active material layer 1, an anode current collector 5 for collecting the anode active material layer 2, and a battery case 6 for storing these members. In the present invention, at least one of the cathode active material layer 1, the anode active material layer 2 and the electrolyte layer 3 is greatly characterized by containing the sulfide solid electrolyte material described in the 'A. Sulfide solid electrolyte material'.

The battery of the present invention is hereinafter described in each constitution.

1. Cathode Active Material Layer

The cathode active material layer in the present invention is a layer containing at least a cathode active material, and may contain at least one of a solid electrolyte material, a conductive material and a binder, as required. In particular, in the present invention, the cathode active material layer contains a solid electrolyte material, which is preferably the sulfide solid electrolyte material described above. The reason therefor is to allow a high-output battery with high stability against moisture. The ratio of the sulfide solid electrolyte material contained in the cathode active material layer varies with kinds of a battery and is preferably, for example, within a range of 0.1% by volume to 80% by volume, above all, within a range of 1% by volume to 60% by volume, particularly, within a range of 10% by volume to 50% by volume. Also, examples of a cathode active material include $LiCoO_2$, $LiMnO_2$, $Li_2NiMn_3O_8$, $LiVO_2$, $LiCrO_2$, $LiFePO_4$, $LiCoPO_4$, $LiNiO_2$ and $LiNi_{1/3}Co_{1/3}Mn_{1/3}O_2$.

The cathode active material layer may further contain a conductive material. The addition of the conductive material allows conductivity of the cathode active material layer to be improved. Examples of the conductive material include acetylene black, Ketjen Black and carbon fiber. Also, the cathode active material layer may contain a binder. Examples of kinds of the binder include a fluorine-containing binder such as polyvinylidene fluoride (PVDF). Also, the thickness of the cathode active material layer is preferably within a range of 0.1 μm to 1000 μm, for example.

2. Anode Active Material Layer

The anode active material layer in the present invention is a layer containing at least an anode active material, and may contain at least one of a solid electrolyte material, a conductive material and a binder, as required. In particular, in the present invention, the anode active material layer contains a solid electrolyte material, which is preferably the sulfide solid electrolyte material described above. The reason therefor is to allow a high-output battery with high stability against moisture. The ratio of the sulfide solid electrolyte material contained in the anode active material layer varies with kinds of a battery and is preferably, for example, within a range of 0.1% by volume to 80% by volume, above all, within a range of 1% by volume to 60% by volume, particularly, within a range of 10% by volume to 50% by volume. Also, examples of an anode active material include a metal active material and a carbon active material. Examples of the metal active material include In, Al, Si, and Sn. On the other hand, examples of the carbon active material include mesocarbon microbeads (MCMB), high orientation property graphite (HOPG), hard carbon and soft carbon. Incidentally, a conductive material and a binder used for the anode active material layer are the same as the case of the cathode active material layer described above. Also, the thickness of the anode active material layer is preferably within a range of 0.1 μm to 1000 μm for example.

3. Electrolyte Layer

The electrolyte layer in the present invention is a layer formed between the cathode active material layer and the anode active material layer. The electrolyte layer is not particularly limited if the layer is a layer such as to allow ion conduction, but is preferably a solid electrolyte layer composed of a solid electrolyte material. The reason therefor is to allow the battery with high safety as compared with a battery using a liquid electrolyte. In addition, in the present invention, a solid electrolyte layer preferably contains the sulfide solid electrolyte material described above. The reason therefor is to allow a high-output battery with high stability against moisture. The ratio of the sulfide solid electrolyte material contained in a solid electrolyte layer is preferably, for example, within a range of 10% by volume to 100% by volume, above all, within a range of 50% by volume to 100% by volume. The thickness of a solid electrolyte layer is preferably within a range of 0.1 μm to 1000 μm, for example, and within a range of 0.1 μm to 300 μm, above all. Also, examples of a method for forming a solid electrolyte layer include a method for compression-molding a solid electrolyte material.

Also, the electrolyte layer in the present invention may be a layer composed of a liquid electrolyte. The case of using a liquid electrolyte allows the higher-output battery though safety needs to be further considered as compared with the case of using a solid electrolyte layer. Also, in this case, ordinarily, at least one of the cathode active material layer and the anode active material layer contains the sulfide solid electrolyte material described above. A liquid electrolyte ordinarily contains a lithium salt and an organic solvent (a nonaqueous solvent). Examples of the lithium salt include inorganic lithium salts such as $LiPF_6$, $LiBF_4$, $LiClO_4$ and $LiAsF_6$, and organic lithium salts such as $LiCF_3SO_3$, $LiN(CF_3SO_2)_2$, $LiN(C_2F_5SO_2)_2$ and $LiC(CF_3SO_2)_3$. Examples of the organic solvent include ethylene carbonate (EC), propylene carbonate (PC), dimethyl carbonate (DMC), diethyl carbonate (DEC), ethylmethyl carbonate (EMC) and butylene carbonate (BC).

4. Other Constitutions

The battery of the present invention comprises at least the anode active material layer, electrolyte layer and cathode active material layer described above, ordinarily further comprising a cathode current collector for collecting the cathode active material layer and an anode current collector for collecting the anode active material layer. Examples of a material for the cathode current collector include SUS, aluminum, nickel, iron, titanium and carbon. On the other hand, examples of a material for the anode current collector include SUS, copper, nickel and carbon. Also, the thickness and shape of the cathode current collector and the anode current collector are preferably selected properly in accordance with factors such as uses of a battery. Also, a battery case of a general battery may be used for a battery case used for the present invention. Examples of the battery case include a battery case made of SUS.

5. Battery

The battery of the present invention may be a primary battery or a secondary battery, preferably a secondary battery among them. The reason therefor is to be repeatedly charged and discharged and be useful as a car-mounted battery, for example. Examples of the shape of the battery of the present invention include a coin shape, a laminate shape, a cylindrical shape and a rectangular shape. Also, a producing method for the battery of the present invention is not particularly limited if the method is a method such as to allow the battery described above, but the same method as a producing method for a general battery may be used. For example, in the case where the battery of the present invention is an all solid state battery, examples of a producing method therefor include a method such that a material composing a cathode active material layer, a material composing a solid electrolyte layer and a material composing an anode active material layer are sequentially pressed to thereby produce a power generating element and this power generating element is stored inside a battery case, which is crimped.

C. Producing Method for Sulfide Solid Electrolyte Material

Next, a producing method for a sulfide solid electrolyte material of the present invention is described. The producing method for a sulfide solid electrolyte material of the present invention may be roughly divided into two embodiments. Then, the producing method for a sulfide solid electrolyte material of the present invention is described while divided into a first embodiment and a second embodiment.

1. First Embodiment

The producing method for the sulfide solid electrolyte material of the first embodiment is a producing method for the sulfide solid electrolyte material described in 'A. Sulfide solid electrolyte material 1. First embodiment', the method comprises steps of: an ion conductive material synthesizing step of synthesizing an amorphized ion conductive material by mechanical milling while using a raw material composition containing the $M_1$ element, the $M_2$ element and the S element, and a heating step of obtaining the sulfide solid electrolyte material by heating the amorphized ion conductive material.

According to the first embodiment, amorphization is performed in the ion conductive material synthesizing step to thereafter perform the heating step, so as to allow the sulfide solid electrolyte material such that the ratio of a crystal phase having a peak in the vicinity of $2\theta=29.58°$ is high. Thus, the sulfide solid electrolyte material with favorable ion conductivity may be obtained. In addition, the use of Li and the divalent element by combination allows the sulfide solid electrolyte material with favorable Li ion conductivity in a low-temperature environment.

Figure 4:
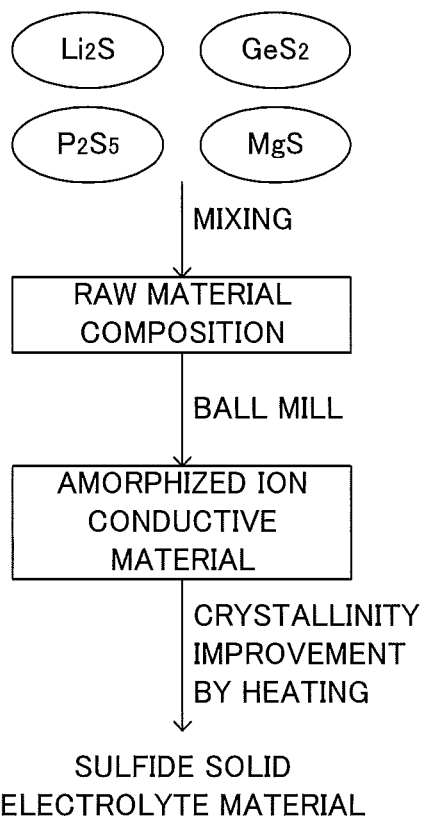
FIG. 4 is an explanatory view showing an example of a producing method for a sulfide solid electrolyte material of the present invention.

FIG. 4 is an explanatory view showing an example of the producing method for the sulfide solid electrolyte material of the first embodiment. In the producing method for the sulfide solid electrolyte material in FIG. 4, first, a raw material composition is produced by mixing $Li_2S$, $P_2S_5$, $GeS_2$ and MgS. On this occasion, in order to prevent the raw material composition from deteriorating due to moisture in the air, the raw material composition is preferably produced under an inert gas atmosphere. Next, ball mill is performed for the raw material composition to obtain an amorphized ion conductive material. Next, the amorphized ion conductive material is heated for improving crystallinity to thereby obtain a sulfide solid electrolyte material.

The first embodiment allows the sulfide solid electrolyte material such that the ratio of a crystal phase having a peak in the vicinity of $2\theta=29.58°$ is high; below, the reason therefor is described. In the first embodiment, the amorphized ion conductive material is once synthesized unlike a conventional synthesis method, which is a solid-phase method. Thus, it is conceived that an environment such that the crystal phase A with high ion conductivity (the crystal phase having a peak in the vicinity of $2\theta=29.58°$) is easily precipitated is brought and the crystal phase A may be precipitated so positively by the heating step thereafter as to allow a value of $I_B/I_A$ to become less than 0.50, which has been conventionally impossible. The reason why an environment such that the crystal phase A is easily precipitated is brought by amorphizing is not completely clear, but it is conceived that there is a possibility that a solution range in the ion conductive material is changed by mechanical milling and an environment such that the crystal phase A is precipitated with difficulty changes into an environment such that the crystal phase A is easily precipitated.

The producing method for the sulfide solid electrolyte material of the first embodiment is hereinafter described in each step.

(1) Ion Conductive Material Synthesizing Step

First, an ion conductive material synthesizing step in the first embodiment is described. The ion conductive material synthesizing step in the first embodiment is a step of synthesizing an amorphized ion conductive material by mechanical milling while using a raw material composition containing the $M_1$ element, the $M_2$ element and the S element.

The raw material composition in the first embodiment is not particularly limited if the raw material composition is such as to contain the $M_1$ element, the $M_2$ element and the S element. Incidentally, the $M_1$ element and the $M_2$ element in the raw material composition are the same as the items described in the 'A. Sulfide solid electrolyte material'. A compound containing the $M_1$ element is not particularly limited but examples thereof include a simple substance of $M_1$ and a sulfide of $M_1$. Examples of the sulfide of $M_1$ include $Li_2S$, MgS, CaS and ZnS. A compound containing the $M_2$ element is not particularly limited but examples thereof include a simple substance of $M_2$ and a sulfide of $M_2$. Examples of the sulfide of $M_2$ include $Me_2S_3$ (Me is a trivalent element such as Al, B, Ga, In and Sb), $MeS_2$ (Me is a tetravalent element such as Ge, Si, Sn, Zr, Ti and Nb) and $Me_2S_5$ (Me is a pentavalent element such as P and V).

A compound containing a S element is not particularly limited but may be a simple substance or a sulfide. Examples of the sulfide include a sulfide containing the $M_1$ element or $M_2$ element described above.

Mechanical milling is a method for grinding a test sample while allowing mechanical energy thereto. In the first embodiment, an amorphized ion conductive material is synthesized by allowing mechanical energy to the raw material composition. Examples of such mechanical milling include vibrating mill, ball mill, turbo mill, mechano-fusion and disk mill; among them, preferably vibrating mill and ball mill.

The conditions of vibrating mill are not particularly limited if the conditions are such as to allow an amorphized ion conductive material. The vibration amplitude of vibrating mill is preferably, for example, within a range of 5 mm to 15 mm, above all, within a range of 6 mm to 10 mm. The vibration frequency of vibrating mill is preferably, for example, within a range of 500 rpm to 2000 rpm, above all, within a range of 1000 rpm to 1800 rpm. The filling factor of a test sample of vibrating mill is preferably, for example, within a range of 1% by volume to 80% by volume, above all, within a range of 5% by volume to 60% by volume, particularly, within a range of 10% by volume to 50% by volume. Also, a vibrator (such as a vibrator made of alumina) is preferably used for vibrating mill.

The conditions of ball mill are not particularly limited if the conditions are such as to allow an amorphized ion conductive material. Generally, larger number of revolutions brings higher production rate of the ion conductive material, and longer treating time brings higher conversion ratio of the raw material composition into the ion conductive material. The number of weighing table revolutions in performing planetary ball mill is preferably within a range of 200 rpm to 500 rpm, for example, and within a range of 250 rpm to 400 rpm, above all. Also, the treating time in performing planetary ball mill is preferably within a range of 1 hour to 100 hours, for example, and within a range of 1 hour to 70 hours, above all.

Incidentally, in the first embodiment, the amorphized ion conductive material is preferably synthesized so as to bring an environment such that the crystal phase having a peak in the vicinity of $2\theta=29.58°$ is easily precipitated.

(2) Heating Step

The heating step in the first embodiment is a step of obtaining the sulfide solid electrolyte material by heating the amorphized ion conductive material.

In the first embodiment, the improvement of crystallinity is intended by heating the amorphized ion conductive material. This heating allows the crystal phase A with high ion conductivity (the crystal phase having a peak in the vicinity of $2\theta=29.58°$) to be precipitated so positively as to allow a value of $I_B/I_A$ to become less than 0.50, which has been conventionally impossible.

The heating temperature in the first embodiment is not particularly limited if the heating temperature is a temperature such as to allow a desired sulfide solid electrolyte material to be obtained, but is preferably a temperature of crystallization temperature or more of the crystal phase A (the crystal phase having a peak in the vicinity of $2\theta=29.58°$). Specifically, the heating temperature is preferably 300° C. or more, more preferably 350° C. or more, far more preferably 400° C. or more, particularly preferably 450° C. or more. On the other hand, the heating temperature is preferably 1000° C. or less, more preferably 700° C. or less, far more preferably 650° C. or less, particularly preferably 600° C. or less. Also, the heating time is preferably adjusted properly so as to allow a desired sulfide solid electrolyte material to be obtained. Also, heating in the first embodiment is preferably performed under an inert gas atmosphere or in a vacuum from the viewpoint of preventing oxidation. Also, the sulfide solid electrolyte material obtained by the first embodiment is the same as the contents described in the 'A. Sulfide solid electrolyte material 1. First embodiment'; therefore, the description herein is omitted.

2. Second Embodiment

The producing method for the sulfide solid electrolyte material of the second embodiment is a producing method for the sulfide solid electrolyte material described in 'A. Sulfide solid electrolyte material 2. Second embodiment', the method comprising steps of: an ion conductive material synthesizing step of synthesizing an amorphized ion conductive material by mechanical milling while using a raw material composition containing the $M_1$ element, the $M_{2a}$ element, the $M_{2b}$ element and the S element, and a heating step of obtaining the sulfide solid electrolyte material by heating the amorphized ion conductive material.

According to the second embodiment, amorphization is performed in the ion conductive material synthesizing step to thereafter perform the heating step, so as to allow the sulfide solid electrolyte material to be obtained such that the octahedron O, the tetrahedron $T_1$ and the tetrahedron $T_2$ have a predetermined crystal structure (a three-dimensional structure). Thus, the sulfide solid electrolyte material with favorable ion conductivity may be obtained. In addition, the use of Li and the divalent element by combination allows the sulfide solid electrolyte material with favorable Li ion conductivity to be obtained in a low-temperature environment.

The ion conductive material synthesizing step and the heating step in the second embodiment are basically the same as the contents described in the 'C. Producing method for sulfide solid electrolyte material 1. First embodiment'; therefore, the description herein is omitted. Various kinds of conditions are preferably determined so as to allow a desired sulfide solid electrolyte material to be obtained.

Incidentally, the present invention is not limited to the embodiments. The embodiments are exemplification, and any is included in the technical scope of the present invention if it has substantially the same constitution as the technical idea described in the claim of the present invention and offers similar operation and effect thereto.

EXAMPLES

The present invention is described more specifically while showing examples hereinafter.

Example 1

Lithium sulfide ($Li_2S$, manufactured by Nippon Chemical Industrial Co., Ltd.), diphosphorus pentasulfide ($P_2S_5$, manufactured by Sigma-Aldrich Co. LLC.), germanium sulfide ($GeS_2$, manufactured by Kojundo Chemical Lab. Co., Ltd.) and magnesium sulfide (MgS, manufactured by Kojundo Chemical Lab. Co., Ltd.) were used as a starting material. These powders were mixed in a glove box under an argon atmosphere at a ratio of 0.3903688 g of $Li_2S$, 0.3025689 g of $P_2S_5$, 0.304655573 g of $GeS_2$ and 0.00240665 g of MgS to obtain a raw material composition. Next, 1 g of the raw material composition was projected into a pot made of zirconia (45 ml) together with zirconia ball (10 mm φ, 10 pieces) to hermetically seal the pot completely (argon atmosphere). This pot was mounted on a planetary ball milling machine (P7™ manufactured by Fritsch Japan Co., Ltd.) to perform mechanical milling for 40 hours at the number of weighing table revolutions of 370 rpm. Thus, an amorphized ion conductive material was obtained.

Next, powder of the obtained ion conductive material was put in a carbon-coated quartz tube and vacuum-sealed. The pressure of the quartz tube for vacuum-sealing was approximately 30 Pa. Next, the quartz tube was placed in a burning furnace, heated from room temperature to 550° C. over 6 hours, maintained at 550° C. for 8 hours, and thereafter slowly cooled up to room temperature. Thus, a crystalline sulfide solid electrolyte material having a composition of $Li_{3.43275}Mg_{0.008625}Ge_{0.45}P_{0.55}S_4$ was obtained. This composition is a composition in which part of Li in $Li_{(4-x)}Ge_{(1-x)}P_xS_4$ (x=0.55) was substituted with Mg, and the substituted amount δ is 0.5%.

Comparative Example 1

$Li_2S$, $P_2S_5$ and $GeS_2$ were mixed at a ratio of 0.3925051 g, 0.302704 g and 0.30479 g respectively to obtain a raw material composition. A crystalline sulfide solid electrolyte material was obtained in the same manner as Example 1 except for using this raw material composition. The obtained sulfide solid electrolyte material has a composition of $Li_{3.45}Ge_{0.45}P_{0.55}S_4$. This composition corresponds to $Li_{(4-x)}Ge_{(1-x)}P_xS_4$ (x=0.55).

Comparative Example 2

$Li_2S$, $P_2S_5$, $GeS_2$ and MgS were mixed at a ratio of 0.3882344 g, 0.302434 g, 0.30452 g and 0.004811 g respectively to obtain a raw material composition. A crystalline sulfide solid electrolyte material was obtained in the same manner as Example 1 except for using this raw material composition. The obtained sulfide solid electrolyte material has a composition of $Li_{3.4155}Mg_{0.01725}Ge_{0.45}P_{0.55}S_4$. This composition is a composition in which part of Li in $Li_{(4-x)}Ge_{(1-x)}P_xS_4$ (x=0.55) was substituted with Mg, and the substituted amount δ is 1%.

Comparative Example 3

$Li_2S$, $P_2S_5$, $GeS_2$ and MgS were mixed at a ratio of 0.383971 g, 0.302166 g, 0.304249 g and 0.0096138 g respectively to obtain a raw material composition. A crystalline sulfide solid electrolyte material was obtained in the same manner as Example 1 except for using this raw material composition. The obtained sulfide solid electrolyte material has a composition of $Li_{3.381}Mg_{0.0345}Ge_{0.45}P_{0.55}S_4$. This composition is a composition in which part of Li in $Li_{(4-x)}Ge_{(1-x)}P_xS_4$ (x=0.55) was substituted with Mg, and the substituted amount δ is 2%.

Comparative Example 4

$Li_2S$, $P_2S_5$, $GeS_2$ and MgS were mixed at a ratio of 0.350137 g, 0.300032 g, 0.302101 g and 0.047729 g respectively to obtain a raw material composition. A crystalline sulfide solid electrolyte material was obtained in the same manner as Example 1 except for using this raw material composition. The obtained sulfide solid electrolyte material has a composition of $Li_{3.105}Mg_{0.1725}Ge_{0.45}P_{0.55}S_4$. This composition is a composition in which part of Li in $Li_{(4-x)}Ge_{(1-x)}P_xS_4$ (x=0.55) was substituted with Mg, and the substituted amount δ is 10%.

[Evaluations]
(X-Ray Diffraction Measurement)

Figure 5A:
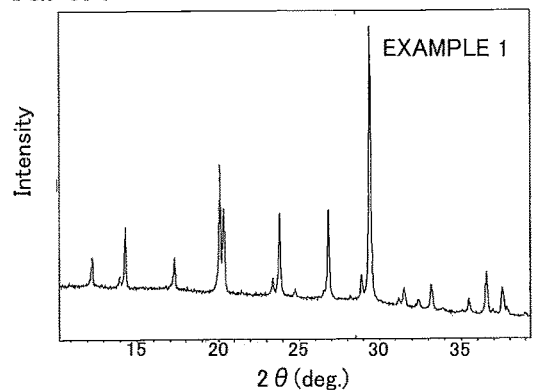
FIGS. 5A to 5E are each X-ray diffraction spectra of a sulfide solid electrolyte material obtained in Example 1 and Comparative Examples 1 to 4.
Figure 5D:
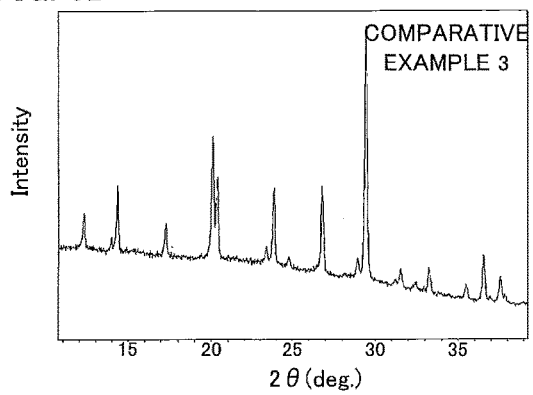
Figure 5B:
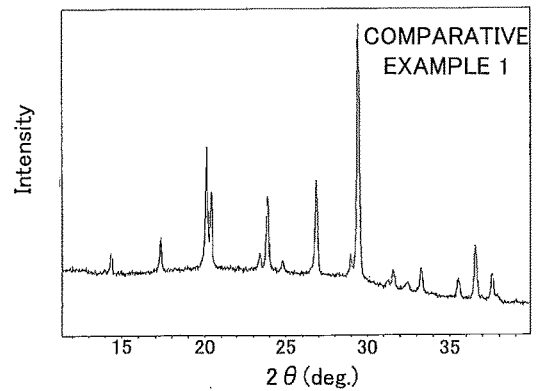
Figure 5E:
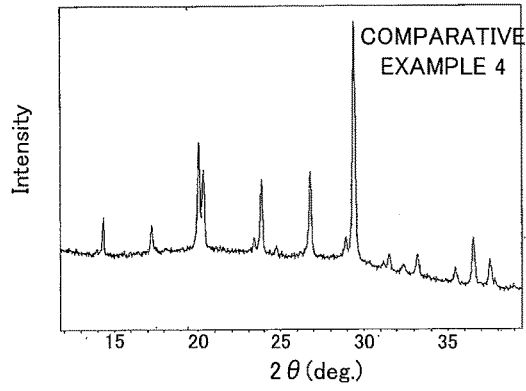
Figure 5C:
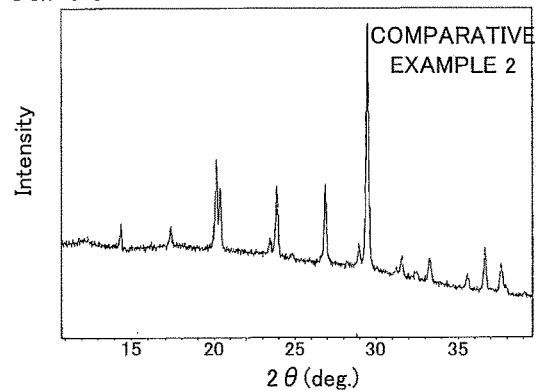

X-ray diffraction (XRD) measurement was performed while using the sulfide solid electrolyte materials obtained in Example 1 and Comparative Examples 1 to 4. XRD measurement was performed for a powder sample under an inert atmosphere on the conditions of using a CuKα ray. The results are shown in FIGS. 5A to 5E. As shown in FIG. 5B, in Comparative Example 1, a peak appeared at a position of 2θ=17.38°, 20.18°, 20.44°, 23.56°, 23.96°, 24.93°, 26.96°, 29.07°, 29.58°, 31.71°, 32.66° and 33.39°. These peaks are conceived to be the peaks of the crystal phase A with high ion conductivity. Incidentally, the peak of 2θ=27.33°±0.50° as the peak of the crystal phase B with low ion conductivity was not confirmed. Also, it was confirmed that Comparative Examples 2 to 4 and Example 1 had the same diffraction pattern as Comparative Example 1.

(X-Ray Structural Analysis)

The crystal structure of the sulfide solid electrolyte material obtained in Comparative Example 1 was identified by X-ray structural analysis. The crystal system and crystallographic group were determined by a direct method on the basis of a diffraction pattern obtained in XRD to thereafter identify the crystal structure by a real space method. As a result, it was confirmed that the sulfide solid electrolyte material had the crystal structure described above as shown in FIG. 2. That is to say, the crystal structure was such that the tetrahedron $T_1$ ($GeS_4$ tetrahedron and $PS_4$ tetrahedron) and the octahedron O ($LiS_6$ octahedron) shared an edge, and the tetrahedron $T_2$ ($PS_4$ tetrahedron) and the octahedron O ($LiS_6$ octahedron) shared a corner. Also, as described above, Example 1 had the same diffraction pattern as Comparative Example 1, so that it was confirmed that the same crystal structure was formed in Example 1.

(Measurement of Li Ion Conductance)

The change of Li ion conductance in temperature was evaluated while using the sulfide solid electrolyte materials obtained in Example 1 and Comparative Examples 1 to 4. First, a test sample was weighed by a suitable amount in a glove box of an argon atmosphere, put in a polyethylene terephthalate tube (a PET tube, an inside diameter of 10 mm, an outside diameter of 30 mm, a height of 20 mm), and held between powder molding jigs made of carbon tool steel S45C anvil from the top and bottom. Next, the test sample was pressed at an indicating pressure of 6 MPa (a molding pressure of approximately 110 MPa) by using a uniaxial pressing machine (P-6™ manufactured by Rikenseiki CO., Ltd.), and molded into pellets with a diameter of 10 mm and an optional thickness. Next, gold powder (manufactured by The Nilaco Corporation, treelike, a particle diameter of approximately 10 μm) was mounted by 13 mg to 15 mg on both sides of the pellets, and dispersed uniformly on the surface of the pellets, which were molded at an indicating pressure of 30 MPa (a molding pressure of approximately 560 MPa). Thereafter, the obtained pellets were put in a closed electrochemical cell which may maintain an argon atmosphere.

An impedance gain-phase analyzer manufactured by Solartron Inc. (solartron 1260™) was used for the measurement as FRA (Frequency Response Analyzer), and a small-sized environmental tester (Espec corp, SU-241™, −40° C. to 150° C.) was used as a constant temperature unit. The measurement was started from a high-frequency range on the conditions of an alternating voltage of 10 mV to 1000 mV, a frequency range of 1 Hz to 10 MHz, an integration time of 0.2 second, and a temperature of 23° C. Zplot was used for measurement software and Zview was used for analysis software. The obtained results are shown in FIG. 6 and Table 1.

TABLE 1

| | SUBSTITUTED | Li ION CONDUCTANCE (S/cm) | | | |
|---|---|---|---|---|---|
| | AMOUNT δ | 25° C. | 0° C. | −20° C. | −30° C. |
| COMPARATIVE EXAMPLE 1 | 0 | $5.86 \times 10^{-3}$ | $1.94 \times 10^{-3}$ | $7.98 \times 10^{-4}$ | $4.55 \times 10^{-4}$ |
| EXAMPLE 1 | 0.5 | $5.76 \times 10^{-3}$ | $2.39 \times 10^{-3}$ | $9.84 \times 10^{-4}$ | $4.95 \times 10^{-4}$ |
| COMPARATIVE EXAMPLE 2 | 1 | $4.79 \times 10^{-3}$ | $1.53 \times 10^{-3}$ | $5.55 \times 10^{-4}$ | $3.92 \times 10^{-4}$ |
| COMPARATIVE EXAMPLE 3 | 2 | $3.84 \times 10^{-3}$ | $1.20 \times 10^{-3}$ | $4.83 \times 10^{-4}$ | $3.03 \times 10^{-4}$ |
| COMPARATIVE EXAMPLE 4 | 10 | $8.05 \times 10^{-4}$ | $2.22 \times 10^{-4}$ | $6.60 \times 10^{-5}$ | $3.66 \times 10^{-5}$ |

Figure 6:
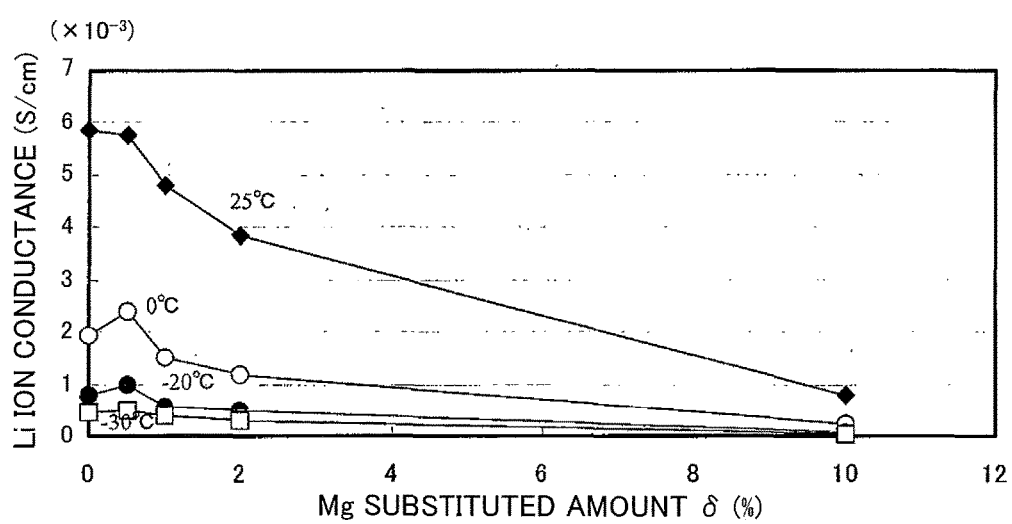
FIG. 6 is a result of measuring Li ion conductance of a sulfide solid electrolyte material each obtained in Example 1 and Comparative Examples 1 to 4.

As shown in FIG. 6 and Table 1, the sulfide solid electrolyte material obtained in Example 1 (δ=0.5%) exhibited approximately the same Li ion conductance as Comparative Example 1 (δ=0%) at 25° C., and exhibited higher Li ion conductance than Comparative Example 1 (δ=0%) in a low-temperature environment of 0° C., −20° C. and −30° C.

REFERENCE SIGNS LIST 1 cathode active material layer
2 anode active material layer
3 electrolyte layer
4 cathode current collector
5 anode current collector
6 battery case
10 battery

The invention claimed is:

1. A sulfide solid electrolyte material comprising an $M_1$ element, an $M_2$ element and a S element,
the $M_1$ being a combination of Li and a divalent element of at least one kind selected from the group consisting of Mg, Ca and Zn, and
the $M_2$ being at least one kind selected from the group consisting of P, Sb, Si, Ge, Sn, B, Al, Ga, In, Ti, Zr, V and Nb,
wherein the sulfide solid electrolyte material has a peak at a position of 2θ=29.58°±0.50° in X-ray diffraction measurement using a CuKα ray,
does not have a peak at a position of 2θ=27.33°±0.50° in X-ray diffraction measurement using a CuKα ray, or when diffraction intensity at the peak of 2θ=29.58°±0.50° is regarded as $I_A$ and diffraction intensity at the peak of 2θ=27.33°±0.50° is regarded as $I_B$ in a case of having a peak at the position of 2θ=27.33°±0.50°, a value of $I_B/I_A$ is less than 0.50, and
a substituted amount δ(%) of the divalent element is in such a range that the sulfide solid electrolyte material exhibits higher Li ion conductance at 0° C. than a case of δ=0, and satisfies 0<δ(%)<1;

substituted amount $δ(\%)=2X_{1B}/(X_{1A}+2X_{1B})*100$ ($X_{1A}$ is a molar fraction of the Li in the $M_1$ and $X_{1B}$ is a molar fraction of the divalent element in the $M_1$).

2. A sulfide solid electrolyte material having an octahedron O composed of an $M_1$ element and a S element, a tetrahedron $T_1$ composed of an $M_{2a}$ element and a S element, and a tetrahedron $T_2$ composed of an $M_{2b}$ element and a S element, the tetrahedron $T_1$ and the octahedron O sharing an edge, and the tetrahedron $T_2$ and the octahedron O containing a crystal structure sharing a corner as a main body,
wherein the $M_1$ is a combination of Li and a divalent element of at least one kind selected from the group consisting of Mg, Ca and Zn,
the $M_{2a}$ and the $M_{2b}$ are each independently at least one kind selected from the group consisting of P, Sb, Si, Ge, Sn, B, Al, Ga, In, Ti, Zr, V and Nb, and
a substituted amount δ(%) of the divalent element is in such a range that the sulfide solid electrolyte material exhibits higher Li ion conductance at 0° C. than a case of δ=0, and satisfies 0<δ(%)<1;

substituted amount $δ(\%)=2X_{1B}/(X_{1A}+2X_{1B})*100$ ($X_{1A}$ is a molar fraction of the Li in the $M_1$ and $X_{1B}$ is a molar fraction of the divalent element in the $M_1$).

3. A battery comprising a cathode active material layer containing a cathode active material, an anode active material layer containing an anode active material, and an electrolyte layer formed between the cathode active material layer and the anode active material layer,
wherein at least one of the cathode active material layer, the anode active material layer and the electrolyte layer contains the sulfide solid electrolyte material according to claim 1.

4. A battery comprising a cathode active material layer containing a cathode active material, an anode active material layer containing an anode active material, and an electrolyte layer formed between the cathode active material layer and the anode active material layer,
wherein at least one of the cathode active material layer, the anode active material layer and the electrolyte layer contains the sulfide solid electrolyte material according to claim 2.

5. A producing method for a sulfide solid electrolyte material, the sulfide solid electrolyte material being the sulfide solid electrolyte material according to claim 1, the producing method comprising:
an ion conductive material synthesizing step of synthesizing an amorphized ion conductive material by mechanical milling while using a raw material composition containing the $M_1$ element, the $M_2$ element and the S element; and
a heating step of obtaining the sulfide solid electrolyte material by heating the amorphized ion conductive material.

6. A producing method for a sulfide solid electrolyte material, the sulfide solid electrolyte material being the sulfide solid electrolyte material according to claim 2, the producing method comprising:
an ion conductive material synthesizing step of synthesizing an amorphized ion conductive material by mechanical milling while using a raw material composition containing the $M_1$ element, the $M_{2a}$ element, the $M_{2b}$ element and the S element; and a heating step of obtaining the sulfide solid electrolyte material by heating the amorphized ion conductive material.

7. The sulfide solid electrolyte material of claim 1, wherein the $M_{2a}$ is P, and the $M_{2b}$ is Ge.

* * * * *